US008760800B1

(12) United States Patent
Brown et al.

(10) Patent No.: US 8,760,800 B1
(45) Date of Patent: Jun. 24, 2014

(54) SEALING MEMBER FOR CONSTRAINING BALANCE WEIGHTS

(71) Applicant: Western Digital Technologies, Inc., Irvine, CA (US)

(72) Inventors: Matthew L. Brown, Palo Alto, CA (US); Joshua P. Weiher, Bellevue, WA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/868,615

(22) Filed: Apr. 23, 2013

Related U.S. Application Data

(60) Provisional application No. 61/781,893, filed on Mar. 14, 2013.

(51) Int. Cl.
G11B 5/39 (2006.01)

(52) U.S. Cl.
USPC .................................................... 360/99.12

(58) Field of Classification Search
USPC .................................................... 360/99.12
See application file for complete search history.

(56) References Cited

U.S. PATENT DOCUMENTS

| 5,130,870 | A | 7/1992 | Jabbari |
| 5,422,776 | A | 6/1995 | Thorson et al. |
| 5,621,588 | A | 4/1997 | Williams et al. |
| 6,178,062 | B1 | 1/2001 | Yim et al. |
| 6,477,133 | B1 * | 11/2002 | Yoshimura et al. ............ 720/702 |
| 6,479,912 | B2 * | 11/2002 | Kikuchi et al. .................. 310/51 |
| 6,504,673 | B2 | 1/2003 | Choo et al. |
| 6,550,328 | B1 | 4/2003 | Horning et al. |
| 6,724,568 | B1 * | 4/2004 | Suwito et al. ............... 360/99.12 |
| 6,741,418 | B2 | 5/2004 | Renken |
| 6,754,042 | B1 | 6/2004 | Chiou et al. |
| 6,760,188 | B2 * | 7/2004 | Choo et al. ................. 360/99.12 |
| 6,807,721 | B2 | 10/2004 | Choo et al. |
| 6,915,527 | B2 | 7/2005 | Liao et al. |
| 6,947,253 | B2 | 9/2005 | Pfeiffer et al. |
| 7,019,423 | B1 * | 3/2006 | Horng et al. ...................... 310/51 |
| 7,102,850 | B1 | 9/2006 | Buzek et al. |
| 7,167,338 | B2 * | 1/2007 | Iwahara et al. ............. 360/99.08 |
| 7,295,400 | B2 | 11/2007 | Tran et al. |
| 7,307,813 | B1 | 12/2007 | Suwito |
| 7,342,746 | B1 | 3/2008 | Lin |
| 7,463,446 | B2 | 12/2008 | Elsing |
| 7,483,239 | B2 * | 1/2009 | Hiramatsu et al. ......... 360/99.08 |
| 7,602,583 | B2 | 10/2009 | Makita |
| 7,630,171 | B2 | 12/2009 | Lee et al. |
| 2001/0038601 | A1 * | 11/2001 | Kikuchi et al. ................ 369/263 |
| 2004/0052200 | A1 * | 3/2004 | Liao et al. ..................... 369/263 |
| 2005/0047003 | A1 | 3/2005 | Nakamiya et al. |
| 2007/0263321 | A1 | 11/2007 | Chan et al. |
| 2008/0024925 | A1 | 1/2008 | Shikano |
| 2012/0002324 | A1 | 1/2012 | Howie et al. |

* cited by examiner

Primary Examiner — Mark Blouin

(57) ABSTRACT

A disk drive assembly including a disk hub including a substantially cylindrical portion having an end surface and a side wall, and a recessed portion formed in the end surface of the substantially cylindrical portion, a disk clamping element configured to engage the side wall of the substantially cylindrical portion, a disk media disposed between the disk hub and the disk clamping element, a balance weight configured to be inserted into the recessed portion of the disk hub, and a sealing member configured to attach to the end surface of the substantially cylindrical portion of the disk hub and at least partially cover the recessed portion.

20 Claims, 5 Drawing Sheets

SEALING MEMBER FOR CONSTRAINING BALANCE WEIGHTS

CROSS-REFERENCE TO RELATED APPLICATION(S)

This application claims the benefit of U.S. provisional application No. 61/781,893, filed Mar. 14, 2013, the disclosure of which is hereby incorporated by reference.

FIELD

The present disclosure relates generally to information storage devices, and in particular to balance weights used in cooperation with disk hubs.

BACKGROUND

Disk drives typically include one or more balance weights attached to the disk hub to compensate for weight imbalances that may naturally occur in the manufacturing and assembling of the disk hub, disk media, or disk clamp (i.e., the disk pack). The previous method for balancing disk packs was to install an interference-fit rubber plug (an example type of a balance weight) into a hole in the disk clamp. The motor hub would provide a surface for the plug to sit against, while the interference-fit of the tooling holes would hold the plug and prevent it from dislodging from the holes. However, this balancing method required very tight tolerances on the plugs, the tooling holes, and in addition the location of the features needed to be very precise in order to press the rubber plug into the hole.

BRIEF DESCRIPTION OF THE DRAWINGS

A general architecture that implements the various features of the disclosure will now be described with reference to the drawings. The drawings and the associated descriptions are provided to illustrate example implementations and not to limit the scope of the disclosure. Throughout the drawings, reference numbers are reused to indicate correspondence between referenced elements.

DETAILED DESCRIPTION

Figure 1:
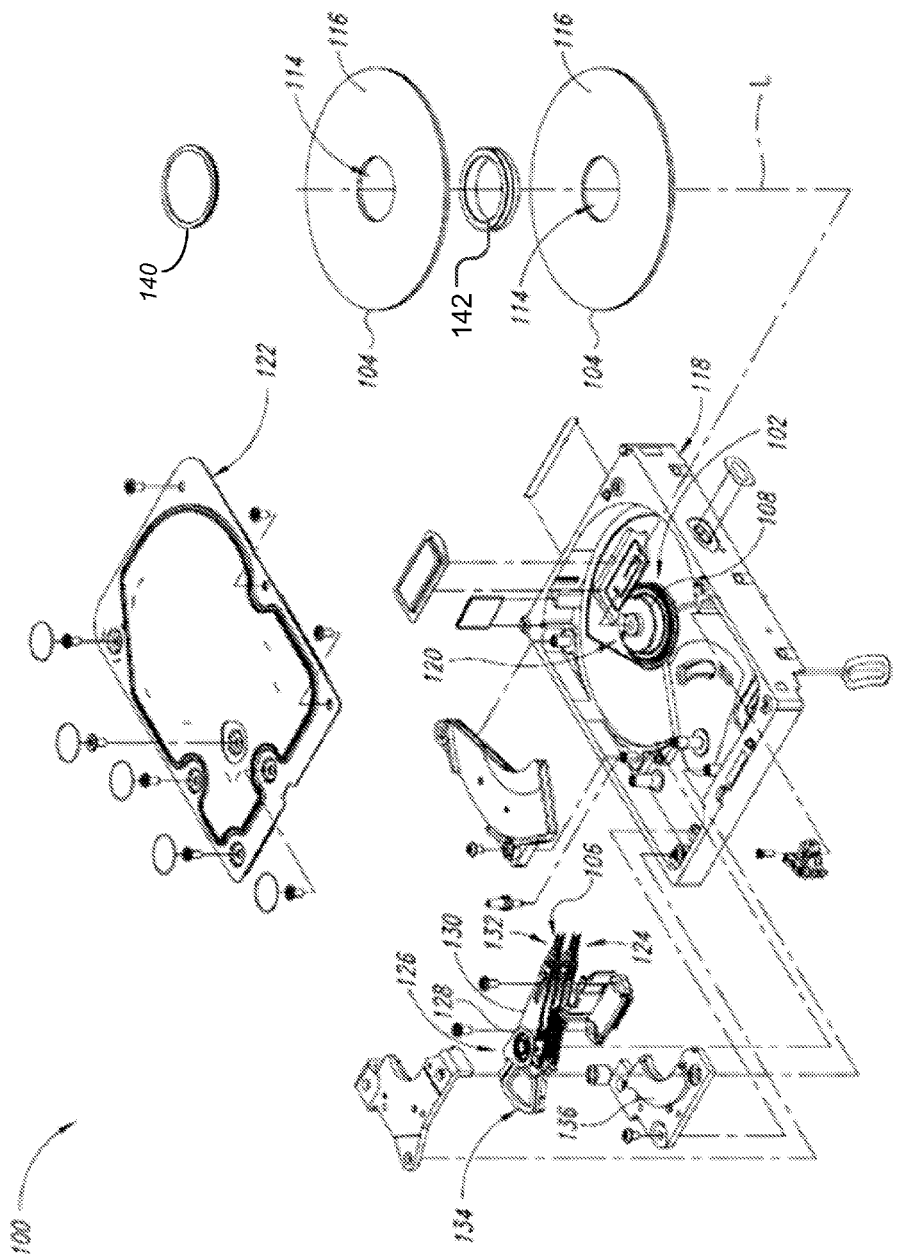
FIG. 1 is an exploded, perspective view generally illustrating a disk drive including a disk hub and disk clamp according to an example implementation of the present disclosure.

Referring to FIG. 1, a disk drive 100 is illustrated, according to one example implementation. The disk drive 100 comprises a hub 102, a disk 104 physically contacting and supported by at least one mounting surface (not labeled in FIG. 1 of the hub 102), and a head 106 operable to write to and read from the disk 104. In one implementation, the hub 102 comprises a substantially cylindrical portion 108 which defines a longitudinal axis L and a mounting surface substantially normal to the longitudinal axis L, the mounting surface extending radially outward.

As illustrated herein, the disk drive 100 comprises a magnetic disk drive, and the structures and methods described herein will be described in terms of such a disk drive. However, these structures and methods may also be applied to and/or implemented in other disk drives, including, e.g., optical and magneto-optical disk drives.

The disks 104 may comprise any of a variety of magnetic or optical disk media having a substantially concentric opening 114 defined there through. Of course, in other example implementations, the disk drive 100 may include more or fewer disks. For example, the disk drive 100 may include one disk or it may include two or more disks. If 2 or more disks 104 are used, a spacer 142 may be provided between the one or more of the disks 104. The disks 104 each include a disk surface 116, as well as an opposing disk surface not visible in FIG. 1. In one implementation, the disk surfaces 116 comprise a plurality of generally concentric tracks for storing data.

As illustrated, the hub 102 may be coupled to and support the disks 104. The hub 102 may also be rotatably attached to a motor base 118 of the disk drive 100, and may form one component of a motor 120 (e.g., a spindle motor). The motor 120 and the hub 102 may be configured to rotate the disks 104 about the longitudinal axis L.

Further, a disk clamp 140 may be coupled to the hub 102 to provide a downward clamping force to the disks 104. Specifically, the disk clamp 140 may be positioned above the disks 104 and attached to an upper surface of the hub 102. In some implementations, the hub 102 may have a substantially cylindrical shape with a threaded exterior 146 (shown in FIG. 3). Further, the disk clamping element may include a threaded region 144 (shown in FIG. 3), which interacts with the hub 102. The interaction of the disk clamp 140 and the hub 102 provide a downward clamping force to the disk 104.

The disk drive 100 may further include a cover 122, which, together with the motor base 118, may house the disks 104 and the motor 120. The disk drive 100 may also include a head stack assembly ("HSA") 124 rotatably attached to the motor base 118. The HSA 124 may include an actuator 126 comprising an actuator body 128 and one or more actuator arms 130 extending from the actuator body 128. The actuator body 128 may further be configured to rotate about an actuator pivot axis.

One or two head gimbal assemblies ("HGA") 132 may be attached to a distal end of each actuator arm 130. Each HGA 132 includes a head 106 operable to write to and read from a corresponding disk 104. The HSA 124 may further include a coil 134 through which a changing electrical current is passed during operation. The coil 134 interacts with one or more magnets 136 that are attached to the motor base 118 to form a voice coil motor ("VCM") for controllably rotating the HSA 124.

The head 106 may comprise any of a variety of heads for writing to and reading from a disk 104. In magnetic recording applications, the head 106 may include an air bearing slider and a magnetic transducer that includes a writer and a read element. The magnetic transducer's writer may be of a longitudinal or perpendicular design, and the read element of the magnetic transducer may be inductive or magneto resistive. In optical and magneto-optical recording applications, the head may include a mirror and an objective lens for focusing laser light on to an adjacent disk surface.

The disk drive 100 may further include a printed circuit board ("PCB") (not shown). The PCB may include, inter alia, a disk drive controller for controlling read and write operations and a servo control system for generating servo control signals to position the actuator arms 130 relative to the disks 104.

Figure 2:
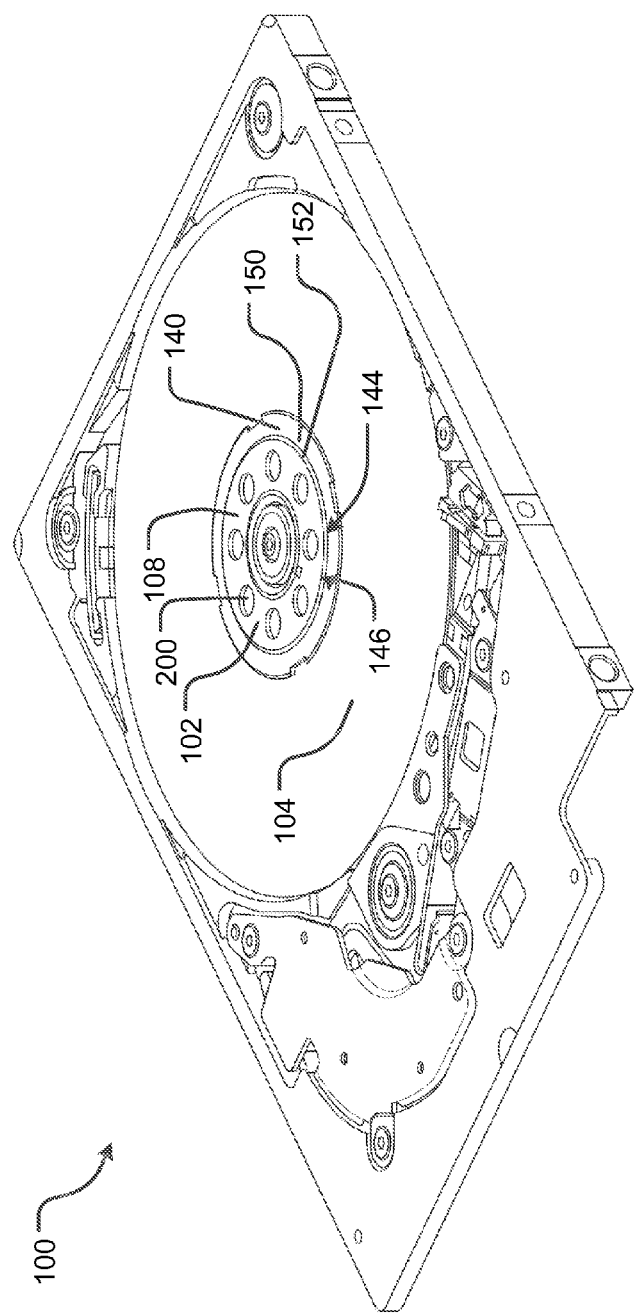
FIG. 2 is an enlarged perspective view illustrating the disk drive including the disk hub and disk clamp according to the example implementation of the present disclosure.
Figure 3:
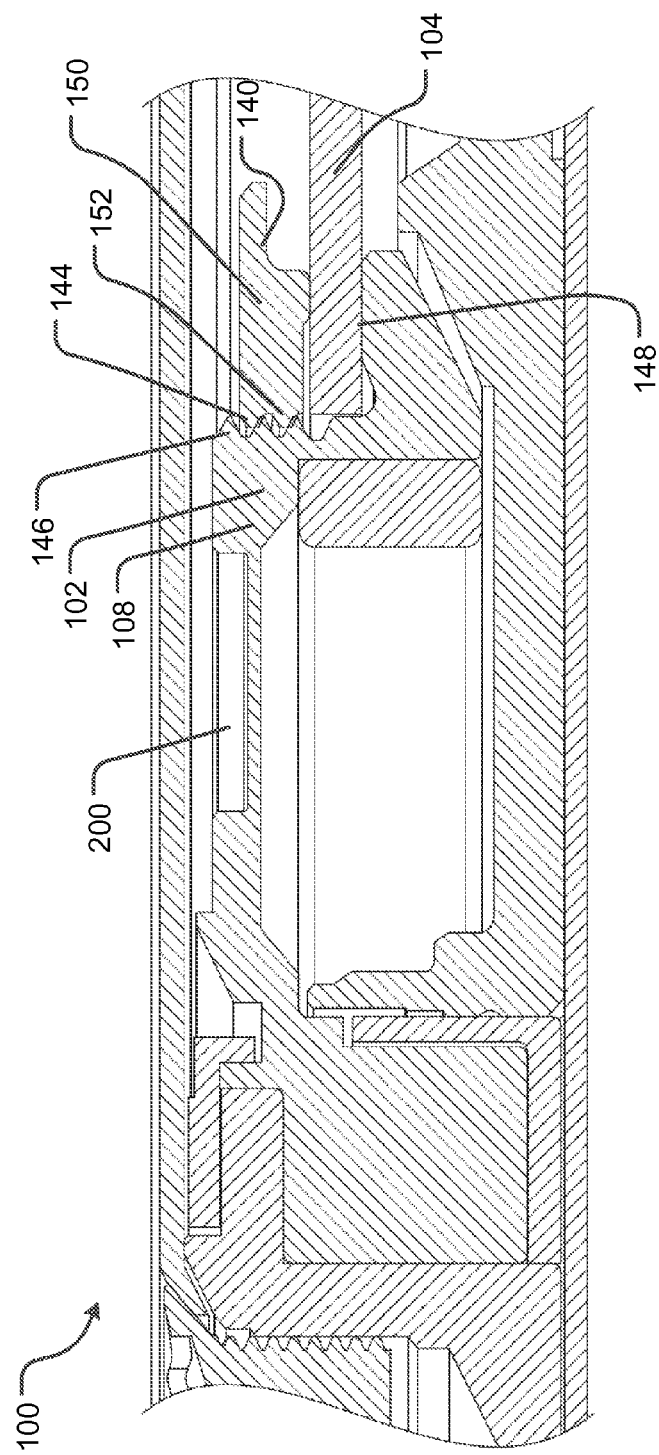
FIG. 3 is a sectional view of the disk drive without a balance weight inserted into the disk hub.

FIG. 2 illustrates an enlarged perspective view illustrating the disk drive including the disk hub and disk clamp according to the example implementation of the present disclosure. Further, FIG. 3 illustrates a sectional view of the disk drive without a balance weight inserted into the disk hub. As illustrated in FIGS. 2 and 3, the hub 102 includes a cylindrical portion 108 and a mounting surface 148 on which a disk 104 has been mounted. The cylindrical portion 108 has a plurality of threads formed on a vertical, outer surface thereof to form the threaded region 146. However, example implementations of the hub 102 need not have a threaded region 146 formed on the cylindrical portion 108.

Further, the disk clamp 140 includes a body portion 150 having a substantially cylindrical shape. Further, the body portion 150 may have a hollow radially inner region, such that the body portion 150 forms an annular shape. In some example implementations, the radially inner region 152 of the annular shape of the body portion 150 may be configured to engage the threaded region 146 of the cylindrical portion 108 of the hub 102. However, example implementations of the disk clamp 140 need not have a threaded portion 144 formed of the radially inner region 152 of the cylindrical portion 108.

Additionally, the hub 102 may also include one more recessed portions 200 formed in the upper surface of the cylindrical portion 108. The recessed portion 200 is configured to receive one or more balance weights (not shown in FIGS. 2 and 3; refer to element 400 in FIGS. 4 and 6). In FIGS. 2 and 3, each of the recessed portions 200 has a substantially cylindrical shape. However, the size of the recessed portions 200 formed in the upper surface of the cylindrical portion 108 are not particularly limited and may be sized to be larger than or substantially equal in size to the balance weights 400 to be inserted into the recessed portions 200. Thus, the manufacturing of the balance weights 400 may not require the tight tolerances associated with press-fit rubber plugs being used as balance weights as discussed above.

Additionally, the recessed portions 200 may be formed in any one of a variety of shapes, including ovals, squares, triangles, or any other shape that may be apparent to a person of ordinary skill in the art.

Further, in FIG. 2, eight recessed portions 200 are provided in a regularly spaced arrangement around the upper surface of the cylindrical portion 108. However, the specific number and location of the recessed portions 200 are not particularly limited to this configuration and may include more or less recessed portions compared to the example implementation shown in FIG. 2.

Figure 4:
FIG. 4 is a perspective view of a balance weight to be inserted into the disk hub.

FIG. 4 illustrates a balance weight 400 according to an example implementation of the present disclosure. In this example implementation, the balance weight 400 has a substantially cylindrical shape. However, the balance weight 400 is not particularly limited to a cylindrical shape and may have any alternative shape including ovals, squares, triangles, or any other shape that may be apparent to a person of ordinary skill in the art. Further, the balance weight 400 may be sized to be smaller than the recessed portion 200 of the hub 102 to allow easy slip fit placement of the balance weight 400 in the recessed region 200. In some implementations, the balance weight may have a height of about 0.35 mm, but the height is not limited to this particular example implementation and may have a smaller or larger size.

The material used to form the balance weight 400 is not particularly limited and may include rubber and polymer materials typically used for press-fit balance weights. Additionally, the balance weight 400 may also be formed from metal materials such as stainless steel or any other clean room approved metal. As metal materials typically have a higher density than rubber (metal materials may have specific gravities close to 8, while rubbers may have specific gravities close to 3), heavier metal balance weights, with a similar volume, can be used to correct larger imbalances. Additionally, the slip fit placement of the balance weights may allow for looser tolerances in manufacturing the balance weights and may also produce less shedding and particle generation during installation. However, example implementations need not achieve these potential advantages or benefits, or any other advantage, or benefit.

Figure 5:
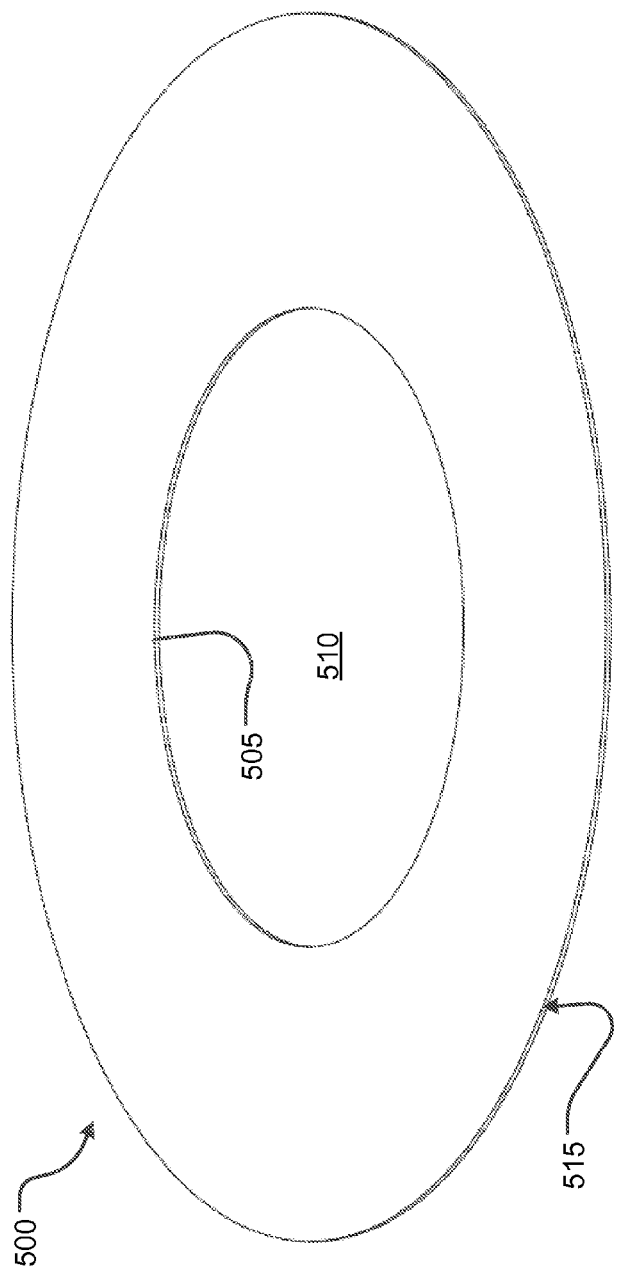
FIG. 5 is a perspective view of an adhesive ring to be attached to the disk hub.
Figure 6:
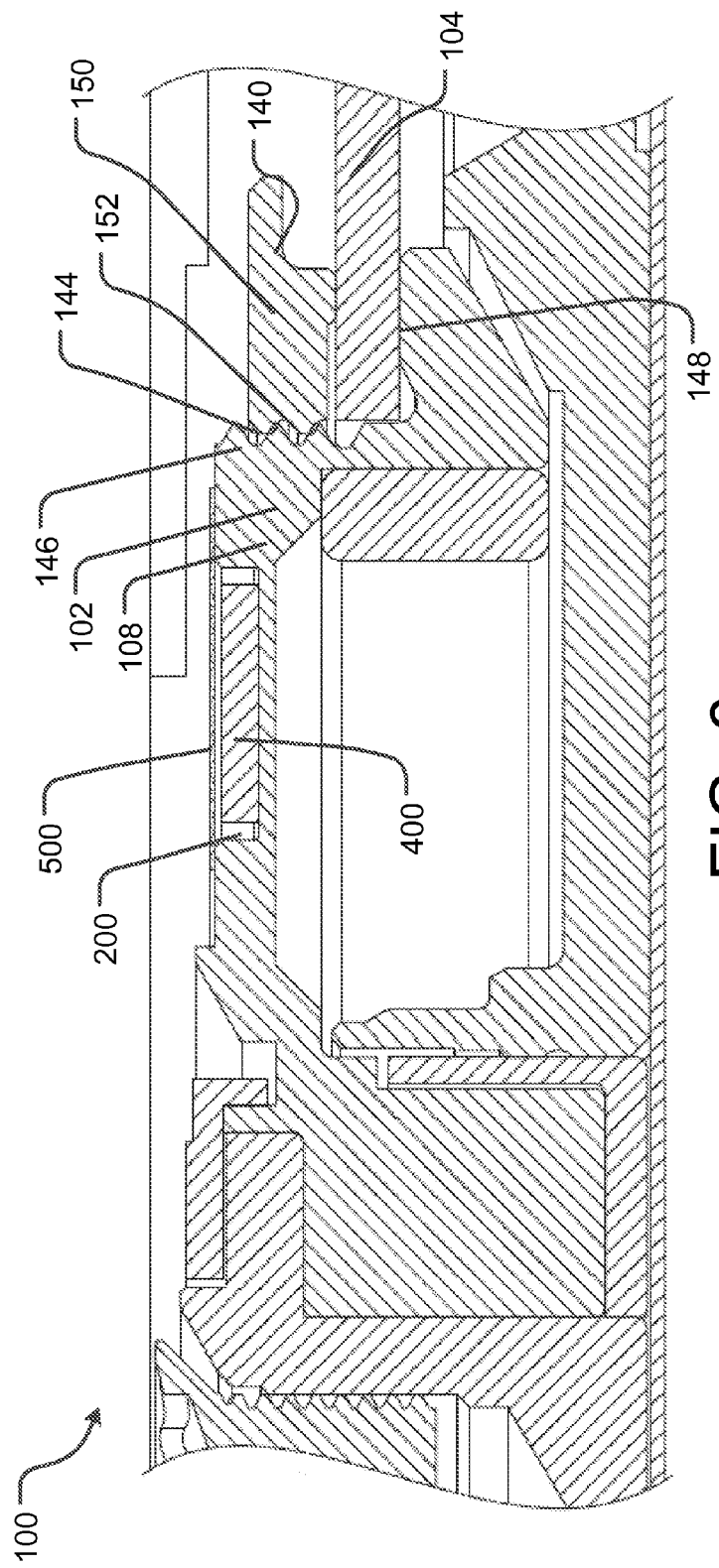
FIG. 6 is a sectional view of the disk drive with the balance weight inserted into the disk hub and the adhesive ring attached to the disk hub.

FIG. 5 illustrates a sealing member 500 that may be attached to the upper surface of the cylindrical portion 108 of the hub 102 to seal the balance weight 400 in the recessed portion 200. Further, FIG. 6 illustrates a sectional view of the disk drive 100 with the balance weight 400 and sealing member 500 installed.

As shown in FIG. 5, the sealing member 500 is substantially flat and is formed to have a thin-profile (referred to herein as a "thin-film" member) compared to its radial size. Such a profile may be considered similar to a sticker or adhesive label. Specifically, the sealing member 500 may have a thickness of about 0.072 mm in some example implementations, which may allow for balancing solutions in drives that are z-height constrained. However, implementations of the sealing member 500 are not limited to this size and may have any size apparent to a person or ordinary skill in the art. Additionally, the sealing member 500 may have an annular shape with an opening 510 formed in a radially inner region 505. In some example implementations, an indexing mark may be used in balancing the disk hub 102, disk media 104, and disk clamp 140. Specifically, an index mark that can be used to determine angular position of the substantially cylindrical hub both during rotation and when stationary may be provided in the upper surface disk hub. In such example implementations, the opening 510 may be configured to not obscure the indexing mark so that balancing may be performed with the sealing member 500 installed. However, implementations of the sealing member 500 are not limited to this configuration and the sealing member 500 may have any shape apparent to a person of ordinary skill in the art.

The sealing member 500 may also have adhesive 515 applied on an undersurface thereof. Thus, the sealing member 500 may be formed as an adhesive ring. The adhesive 515 may be used to attach the sealing member to the upper surface of the cylindrical portion 108 of the hub 102. As shown in the FIG. 6, the sealing member 500 may be attached to the upper surface of the cylindrical portion 108 so that the balance weight 400 is sealed in the recessed portion 200 of the hub to prevent the balance weight 400 from falling out of the recessed portion 200 during operation of the disk drive 100.

Additionally, in some example implementations, the adhesive 515 may be an adhesive that allows removal of the sealing member 500 and maintains adhesiveness after removal and reattachment. Thus, the adhesive 515 may be selected to be an adhesive that maintains sufficient adhesion after removal to allow the sealing member 500 to be reattached at least one time. By providing an adhesive 515 that maintains adhesiveness after removal, such an example embodiment may allow the reworking of an assembled disk drive by allowing the sealing member 500 to be removed, the balance weights 400 may be removed and replaced and/or new balance weights 400 may be added to refine drive performance over time and/or replace drive components. However, example implementations of the present disclosure are not limited to this feature, and some alternative example implementations may be formed to not allow reworking of the assembled drive.

In some example implementations, using the sealing member 500 or adhesive ring placed on top of the hub 102 to secure balance weights 400 into the recess portions 200 may advantageous when dealing with disk drives having smaller form factors, for example, but not limited to, disk drives having heights of 5 mm and 7 mm. However, implementations of the present disclosure are not limited to small form factor drives. Further, completely sealing the recessed portions 200 as shown in FIG. 6 may improve cleanliness by trapping particles. However, implementations of the present disclosure are not required to include the recessed portions 200 being completely sealed or improve cleanliness.

While certain implementations have been described, these implementations have been presented by way of example only, and are not intended to limit the scope of the protection. Indeed, the novel methods and apparatuses described herein may be embodied in a variety of other forms. Furthermore, various omissions, substitutions and changes in the form of the methods and systems described herein may be made without departing from the spirit of the protection. The accompanying claims and their equivalents are intended to cover such forms or modifications as would fall within the scope and spirit of the protection.

What is claimed is:

1. A disk drive assembly comprising:
a disk hub comprising:
a substantially cylindrical portion having an end surface and a side wall, and
a plurality of recessed portions formed in the end surface of the substantially cylindrical portion;
a disk clamping element configured to engage the side wall of the substantially cylindrical portion;
a disk media disposed between the disk hub and the disk clamping element;
a balance weight configured to be inserted into one of the plurality of recessed portions of the disk hub; and
a sealing member configured to attach to the end surface of the substantially cylindrical portion of the disk hub and at least partially cover the recessed portion,
wherein at least one balance weight is placed in one or more of the plurality of recessed portions to correct a weight imbalance of the disk hub, disk clamping element, and disk media.

2. The disk drive assembly of claim 1, wherein the disk clamping element is formed to have an annular shape with a radially inner surface configured to engage the side wall of the substantially cylindrical portion of the disk hub.

3. The disk drive assembly of claim 2, wherein the substantially cylindrical portion of the disk hub further comprises a threaded region formed on the side wall; and
wherein the radially inner surface of the disk clamping element is formed to have a threaded portion configured to engage the threaded region of the side wall of the disk hub.

4. The disk drive assembly of claim 1, wherein the recessed portion of the disk hub is formed to have a substantially cylindrical shape.

5. The disk drive assembly of claim 4, wherein the balance weight is configured to have a substantially cylindrical shape.

6. The disk drive assembly of claim 1, wherein the sealing member is formed as a thin-film member.

7. The disk drive assembly of claim 6, wherein the sealing member is formed with adhesive on a side thereof configured to contact the end surface of the substantially cylindrical portion of the disk hub.

8. The disk drive assembly of claim 7, wherein the adhesive is configured to allow the sealing member to be removable from the end surface of the substantially cylindrical portion of the disk hub and be re-attachable to the end surface after removal.

9. The disk drive assembly of claim 1, wherein the disk hub further comprises an index mark formed on the end surface of the substantially cylindrical portion of the disk hub.

10. The disk drive assembly of claim 9, wherein the sealing member is formed to have a hole in a radially inner region thereof configured to expose the index mark when the sealing member is attached to the end surface of the substantially cylindrical portion of the disk hub.

11. A disk hub comprising:
a body portion having an end surface, and
a plurality of recessed portions formed in the end surface of the body portion;
a balance weight configured to be inserted into one of the plurality of recessed portions of the disk hub; and
a sealing member configured to attach to the end surface and at least partially cover the recessed portion, wherein at least one balance weight is placed in one or more of the plurality of recessed portions to correct a weight imbalance of the disk hub.

12. The disk hub of claim 11, wherein the recessed portion of the disk hub is formed to have a substantially cylindrical shape.

13. The disk hub of claim 12, wherein the balance weight is configured to have a substantially cylindrical shape.

14. The disk hub of claim 11, wherein the sealing member is formed as a thin-film member.

15. The disk hub of claim 14, wherein the sealing member is formed with adhesive on a side thereof configured to contact the end surface of the body portion of the disk hub.

16. The disk hub of claim 15, wherein the adhesive is configured to allow the sealing member to be removable from the end surface of the body portion of the disk hub and re-attachable to the end surface after removal.

17. The disk hub of claim 11, wherein the disk hub further comprises an index mark formed on the end surface of the body portion of the disk hub.

18. The disk hub of claim 17, wherein the sealing member is formed to have a hole in a radially inner region thereof configured to expose the index mark when the sealing member is attached to the end surface of the body portion of the disk hub.

19. A disk drive assembly, comprising:
the disk hub of claim 11; and
a disk clamping element formed to have an annular shape with a radially inner surface configured to engage a side wall of the body portion of the disk hub.

20. The disk drive assembly of claim 19, wherein the side wall of the body portion of the disk hub further comprises a threaded region; and
wherein the radially inner surface of the disk clamping element is formed to have a threaded portion configured to engage the threaded region of the side wall of the body portion of the disk hub.

* * * * *